(12) United States Patent     (10) Patent No.:   US 12,609,628 B2

Jiang et al.     (45) Date of Patent:    Apr. 21, 2026

(54) VOLTAGE AND FREQUENCY TRANSFORMATION SYSTEMS, METHODS AND DEVICES FOR WIND POWER ELECTRIC ENERGY

(71) Applicant: ZHEJIANG JIANGSHAN TRANSFORMER CO., LTD., Quzhou (CN)

(72) Inventors: Zhenjun Jiang, Quzhou (CN); Youxi Wei, Quzhou (CN); Jiawei Zhou, Quzhou (CN)

(73) Assignee: ZHEJIANG JIANGSHAN TRANSFORMER CO., LTD., Quzhou (CN)

( * ) Notice:   Subject to any disclaimer, the term of this patent is extended or adjusted under 35 U.S.C. 154(b) by 196 days.

(21) Appl. No.: 18/756,335

(22) Filed:   Jun. 27, 2024

(65)      Prior Publication Data

US 2025/0233523 A1     Jul. 17, 2025

(30)     Foreign Application Priority Data

Jan. 11, 2024    (CN) ......................... 202410045163.5

(51) Int. Cl.
    *H02M 5/16*       (2006.01)
    *H02M 1/00*       (2006.01)
          (Continued)

(52) U.S. Cl.
    CPC ............. *H02M 5/16* (2013.01); *H02M 1/007* (2021.05); *H02M 1/009* (2021.05); *H02M 5/12* (2013.01); *H02M 5/297* (2013.01)

(58) Field of Classification Search
    CPC .. H02M 1/0003; H02M 1/0025; H02M 1/007; H02M 1/425; H02M 3/335;
             (Continued)

(56)        References Cited

U.S. PATENT DOCUMENTS 3,517,300 A  *   6/1970   McMurray ............ H02M 5/225
                                   363/160
7,679,941 B2 *   3/2010   Raju ..................... H02M 7/217
                                     363/71

(Continued)

FOREIGN PATENT DOCUMENTS

CN       103311951 A   *   9/2013
CN       105790596 A     7/2016
CN       113381415 A     9/2021

OTHER PUBLICATIONS

The State Intellectual Property Office of People's Republic of China, "First Office Action," issued in connection with Chinese Patent Application No. 202410045163.5, dated Jul. 22, 2024, 19 pages. [English Translation Included].

(Continued)

*Primary Examiner* — Thienvu V Tran
*Assistant Examiner* — Shahzeb K Ahmad
(74) *Attorney, Agent, or Firm* — Hanley, Flight & Zimmerman, LLC

(57)          ABSTRACT

Provided are voltage and frequency transformation systems, methods and devices, and relate to the field of transformers. The method includes: inputting low-frequency electric energy with frequency lower than a first predetermined frequency threshold; the low-frequency electric energy including low-frequency and low-voltage electric energy or low-frequency and high-voltage electric energy; obtaining high-frequency electric energy with frequency higher than a second predetermined frequency threshold; the high-frequency electric energy including first high-frequency and low-voltage electric energy or first high-frequency and high-voltage electric energy; obtaining second high-frequency electric energy after voltage transformation; the second high-frequency electric energy including second high-frequency and high-voltage electric energy or second high- (Continued)

Transformer schematic diagram frequency and low-voltage electric energy; obtaining second low-frequency electric energy; the second low-frequency electric energy including second low-frequency and high-voltage electric energy or second low-frequency and low-voltage electric energy.

16 Claims, 3 Drawing Sheets

(51) Int. Cl.
H02M 5/12 (2006.01)
H02M 5/297 (2006.01)

(58) Field of Classification Search
CPC ......... H02M 3/33507; H02M 3/33523; H02M 3/33538; H02M 3/33553; H02M 3/337; H02M 5/10; H02M 5/12; H02M 5/16; H02M 5/225; H02M 5/27; H02M 5/297; H02M 5/44; H02M 5/45; H02M 5/451; H02M 7/48; H02M 7/4807; H02M 7/525; H02M 7/539; H02M 7/758; H02M 7/66; H02J 3/01; H02J 3/36; H02J 3/38
See application file for complete search history.

(56) References Cited

U.S. PATENT DOCUMENTS

| | | | |
|---|---|---|---|
| 8,644,037 B2 * | 2/2014 | Raju ..................... | H02M 5/271 |
| | | | 363/37 |
| 11,689,092 B1 * | 6/2023 | Nasiri ................... | H02M 1/007 |
| | | | 363/21.03 |
| 2010/0014325 A1 | 1/2010 | Raju et al. | |
| 2020/0136524 A1 * | 4/2020 | Chen ................... | H02M 7/4807 |

OTHER PUBLICATIONS

The State Intellectual Property Office of People's Republic of China, "Search Report," issued in connection with Chinese Patent Application No. 202410045163.5, dated Jul. 22, 2024, 5 pages. [English Translation Included].

* cited by examiner

100

Electric energy input module

200

First frequency transformation module

300

Transformer

400

Second frequency transformation module

500

Electric energy output module

<50Hz

>50Hz
High-frequency transformer

<50Hz

Electric energy
input module

Electric energy
output module

Transformer schematic diagram

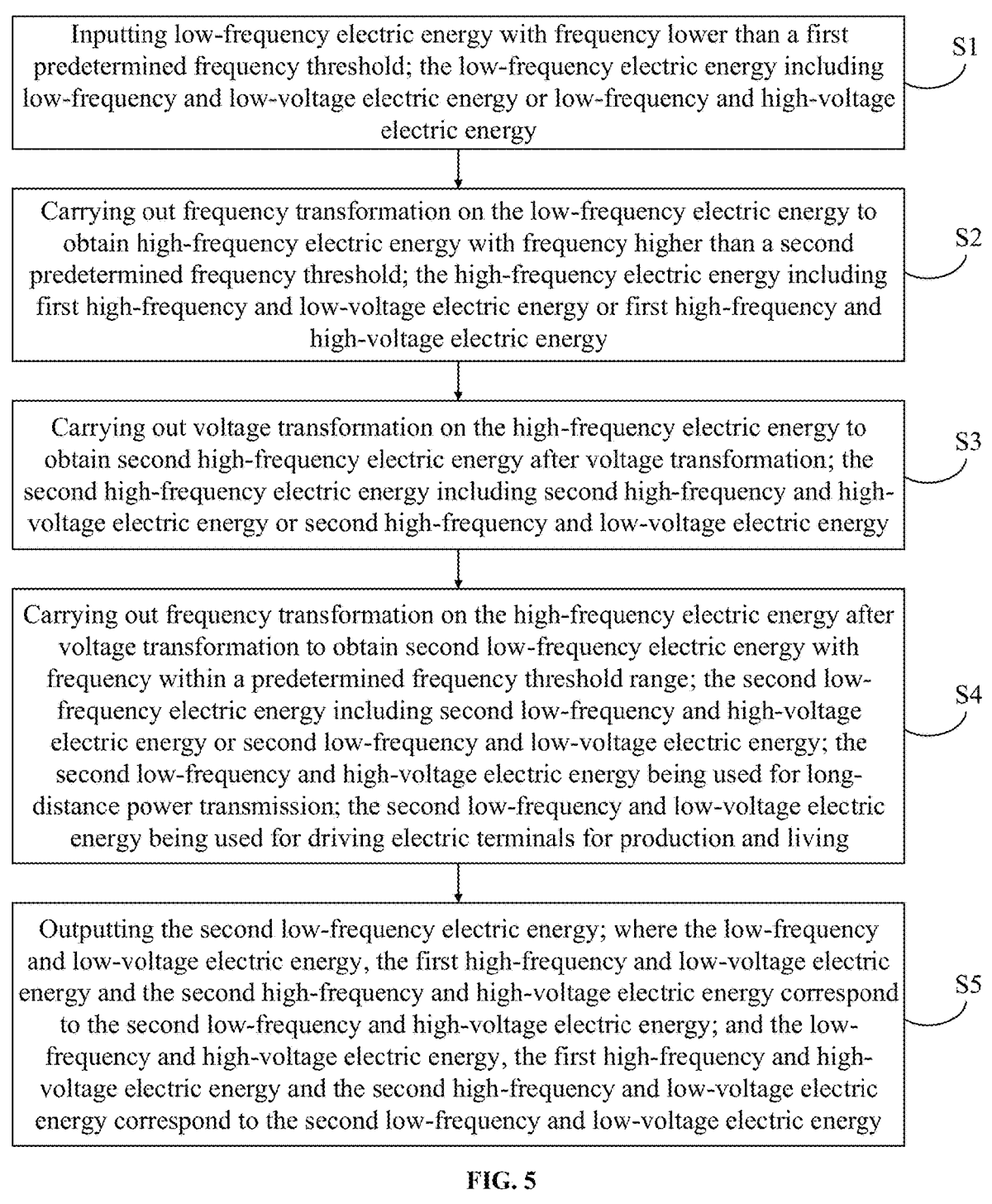

Inputting low-frequency electric energy with frequency lower than a first predetermined frequency threshold; the low-frequency electric energy including low-frequency and low-voltage electric energy or low-frequency and high-voltage electric energy    S1

Carrying out frequency transformation on the low-frequency electric energy to obtain high-frequency electric energy with frequency higher than a second predetermined frequency threshold; the high-frequency electric energy including first high-frequency and low-voltage electric energy or first high-frequency and high-voltage electric energy    S2

Carrying out voltage transformation on the high-frequency electric energy to obtain second high-frequency electric energy after voltage transformation; the second high-frequency electric energy including second high-frequency and high-voltage electric energy or second high-frequency and low-voltage electric energy    S3

Carrying out frequency transformation on the high-frequency electric energy after voltage transformation to obtain second low-frequency electric energy with frequency within a predetermined frequency threshold range; the second low-frequency electric energy including second low-frequency and high-voltage electric energy or second low-frequency and low-voltage electric energy; the second low-frequency and high-voltage electric energy being used for long-distance power transmission; the second low-frequency and low-voltage electric energy being used for driving electric terminals for production and living    S4

Outputting the second low-frequency electric energy; where the low-frequency and low-voltage electric energy, the first high-frequency and low-voltage electric energy and the second high-frequency and high-voltage electric energy correspond to the second low-frequency and high-voltage electric energy; and the low-frequency and high-voltage electric energy, the first high-frequency and high-voltage electric energy and the second high-frequency and low-voltage electric energy correspond to the second low-frequency and low-voltage electric energy    S5

FIG. 5

VOLTAGE AND FREQUENCY TRANSFORMATION SYSTEMS, METHODS AND DEVICES FOR WIND POWER ELECTRIC ENERGY

CROSS-REFERENCE TO RELATED APPLICATION

This patent claims the benefit of and priority to International Application No. PCT/CN2024/078987, filed on Feb. 28, 2024, which claims the benefit and priority of Chinese Patent Application No. 202410045163.5 filed with the China National Intellectual Property Administration on Jan. 11, 2024 and entitled "VOLTAGE AND FREQUENCY TRANSFORMATION SYSTEM, METHOD AND DEVICE FOR WIND POWER ELECTRIC ENERGY". International Application No. PCT/CN2024/078987 and Chinese Patent Application No. 202410045163.5 are incorporated by reference herein in their entireties as part of the present application.

TECHNICAL FIELD

The present disclosure relates to transformers, and, more particularly to voltage and frequency transformation systems, methods and devices for wind power electric energy.

BACKGROUND

In the prior art, the frequency of electric energy generated by a wind turbine is generally lower than the industrial frequency, and the voltage is relatively low. In the long-distance transmission process of electric energy, the voltage of electric energy generated by the wind turbine needs to be increased through the transformer. The cross-sectional area of the iron core of the transformer may need to be increased due to low-frequency electric energy, and thus more core materials are used, thereby resulting in the waste of energy and resources. Moreover, the bigger the iron core is, the larger the weight and volume of the transformer is, and the higher the cost of the transformer is, which is not conducive to production and product transportation, resulting in the rise of manufacturing cost.

SUMMARY

The embodiment of the present disclosure aims to provide a voltage and frequency transformation system, method and device so as to improve the transmission frequency of low-frequency electric energy in the voltage transformation process, so that the high-frequency transmission of electric energy in the voltage transformation process is realized, the cross-sectional area of the transformer iron core in the transmission process is reduced, and the production cost of the voltage transformation system is reduced.

In order to achieve the purpose, the embodiment of the present disclosure provides the following scheme.

A voltage and frequency transformation system includes:

an electric energy input module, configured to input low-frequency electric energy with frequency lower than a first predetermined frequency threshold; the low-frequency electric energy including low-frequency and low-voltage electric energy or low-frequency and high-voltage electric energy;

a first frequency transformation module, connected with the electric energy input module, and configured to carry out frequency transformation on the low-frequency electric energy to obtain high-frequency electric energy with frequency higher than a second predetermined frequency threshold; the high-frequency electric energy including a first high-frequency and low-voltage electric energy or first high-frequency and high-voltage electric energy;

a transformer, connected with the first frequency transformation module, and configured to carry out voltage transformation on the high-frequency electric energy to obtain second high-frequency electric energy after voltage transformation; the second high-frequency electric energy including a second high-frequency and high-voltage electric energy or second high-frequency and low-voltage electric energy;

a second frequency transformation module, connected with the transformer, and configured to carry out frequency transformation on the high-frequency electric energy after voltage transformation to obtain second low-frequency electric energy with frequency within a predetermined frequency threshold range; the second low-frequency electric energy including second low-frequency and high-voltage electric energy or second low-frequency and low-voltage electric energy; the second low-frequency and high-voltage electric energy being used for long-distance power transmission; the second low-frequency electric energy being used for driving electric terminals for production and living;

an electric energy output module, connected with the second frequency transformation module, and configured to output the second low-frequency electric energy;

where in a case that the low-frequency electric energy is the low-frequency and low-voltage electric energy, the high-frequency electric energy is the first high-frequency and low-voltage electric energy, the second high-frequency electric energy is the second high-frequency and high-voltage electric energy, and the second low-frequency electric energy is the second low-frequency and high-voltage electric energy; and in a case that the low-frequency electric energy is the low-frequency and high-voltage electric energy, the high-frequency electric energy is the first high-frequency and high-voltage electric energy, the second high-frequency electric energy is the second high-frequency and low-voltage electric energy, and the second low-frequency electric energy is the second low-frequency and low-voltage electric energy;

where the low-frequency and low-voltage electric energy is electric energy from a wind power generation system and has a voltage equivalent to the rated voltage of a wind power generation system, and the low-frequency and high-voltage electric energy is electric energy from a micro-grid and has a voltage equivalent to a rated voltage of the micro-grid;

the second high-frequency and low-voltage electric energy has a voltage equivalent to a rated voltage of the electric terminals, and the second high-frequency and high-voltage electric energy has a voltage equivalent to a rated voltage of one of a power grid and the micro-grid.

In the embodiment, a frequency value of the high-frequency electric energy and the second high-frequency electric energy have a linear relation with the cross-sectional area of a transformer iron core.

In the embodiment, the linear relation includes:

when a voltage value of the high-frequency electric energy before or after voltage transformation is unchanged, the frequency value of the high-frequency electric energy is inversely correlated with the cross-sectional area of the transformer iron core;

as the frequency value of the high-frequency electric energy increases, the cross-sectional area of the transformer iron core decreases;

as the frequency value of the high-frequency electric energy decreases, the cross-sectional area of the transformer iron core increases.

In the embodiment, when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44 fN\varphi;$$

$$\phi = BS;$$

$$U \infty fS;$$

where U is the high-frequency voltage value; f is the frequency value of the high-frequency electric energy; N is the number of coil turns; φ is the magnetic flux intensity; B is the magnetic induction intensity; and S is the cross-sectional area of the transformer iron core.

A voltage and frequency transformation method includes:

inputting low-frequency electric energy with frequency lower than a first predetermined frequency threshold; the low-frequency electric energy including low-frequency and low-voltage electric energy or low-frequency and high-voltage electric energy;

carrying out frequency transformation on the low-frequency electric energy to obtain high-frequency electric energy with frequency higher than a second predetermined frequency threshold; the high-frequency electric energy including first high-frequency and low-voltage electric energy or first high-frequency and high-voltage electric energy;

carrying out voltage transformation on the high-frequency electric energy to obtain second high-frequency electric energy after voltage transformation; the second high-frequency electric energy including second high-frequency and high-voltage electric energy or second high-frequency and low-voltage electric energy;

carrying out frequency transformation on the high-frequency electric energy after voltage transformation to obtain second low-frequency electric energy with frequency within a predetermined frequency threshold range; the second low-frequency electric energy including second low-frequency and high-voltage electric energy or second low-frequency and low-voltage electric energy; the second low-frequency and high-voltage electric energy being used for long-distance power transmission; the second low-frequency and low-voltage electric energy being used for driving electric terminals for production and living;

outputting the second low-frequency electric energy;

where in a case that the low-frequency electric energy is the low-frequency and low-voltage electric energy, the high-frequency electric energy is the first high-frequency and low-voltage electric energy, the second high-frequency electric energy is the second high-frequency and high-voltage electric energy, and the second low-frequency electric energy is the second low-frequency and high-voltage electric energy; and in a case that the low-frequency electric energy is the low-frequency and high-voltage electric energy, the high-frequency electric energy is the first high-frequency and high-voltage electric energy, the second high-frequency electric energy is the second high-frequency and low-voltage electric energy, and the second low-frequency electric energy is the second low-frequency and low-voltage electric energy;

where the low-frequency and low-voltage electric energy is electric energy from a wind power generation system and has a voltage equivalent to the rated voltage of a wind power generation system, and the low-frequency and high-voltage electric energy is electric energy from a micro-grid and has a voltage equivalent to a rated voltage of the micro-grid;

the second high-frequency and low-voltage electric energy has a voltage equivalent to a rated voltage of the electric terminals, and the second high-frequency and high-voltage electric energy has a voltage equivalent to a rated voltage of one of a power grid and the micro-grid.

In the embodiment, a frequency value of the high-frequency electric energy and the second high-frequency electric energy have a linear relation with the cross-sectional area of a transformer iron core.

In the embodiment, the linear relation includes:

when a voltage value of the high-frequency electric energy before or after voltage transformation is unchanged, the frequency value of the high-frequency electric energy is inversely correlated with the cross-sectional area of the transformer iron core;

as the frequency value of the high-frequency electric energy increases, the cross-sectional area of the transformer iron core decreases; and as the frequency value of the high-frequency electric energy decreases, the cross-sectional area of the transformer iron core increases.

In the embodiment, when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44 fN\varphi;$$

$$\phi = BS;$$

$$U \infty fS;$$

where U is the high-frequency voltage value; f is the frequency value of the high-frequency electric energy; N is the number of coil turns; φ is magnetic flux intensity; B is magnetic induction intensity; and S is the cross-sectional area of the transformer iron core.

An electronic device includes a memory, a processor, and a computer program which is stored in the memory and able to be run on the processor. When the processor executes the computer program, the voltage and frequency transformation method is realized.

A non-transitory computer readable memory medium having a computer program therein. When the computer program is executed, the voltage and frequency transformation method is realized.

In the embodiment of the present disclosure, the low-frequency electric energy with frequency lower than the first predetermined frequency threshold is input by the electric energy input module. The first frequency transformation module is connected with the electric energy input module, and is configured to carry out frequency transformation on the low-frequency electric energy to obtain the high-frequency electric energy with frequency higher than the second predetermined frequency threshold. The transformer is connected with the first frequency transformation module, and is configured to carry out voltage transformation on the high-frequency electric energy to obtain the high-frequency electric energy higher after voltage transformation. The second frequency transformation module is connected with the transformer, and is configured to carry out frequency transformation on the high-frequency electric energy after voltage transformation to obtain the low-frequency electric energy with frequency within the predetermined frequency threshold range. The electric energy output module is connected with the second frequency transformation module, and is configured to output the low-frequency electric energy. The transmission frequency of the low-frequency electric energy in the voltage transformation process is improved, thereby realizing the high-frequency transmission of the electric energy in the voltage transformation process, and reducing the cross-sectional area of the transformer iron core in the transmission process, and thus reducing the production cost of the voltage transformation system.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

FIG. 5 is a flowchart of a voltage and frequency transformation method according to the embodiment of the present disclosure.

REFERENCE SIGNS

100—electric energy input module; 200—first frequency transformation module; 300—transformer; 400—second frequency transformation module; and 500—electric energy output module.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments acquired by the ordinary technical staff in the art under the premise of without contributing creative labor belong to the scope protected by the present disclosure.

The present disclosure aims to provide a voltage and frequency transformation system, method and device so as to solve problems of large weight and volume and high cost of existing transformers, which are not conducive to production and product transportation, and results in high manufacturing cost.

To make the foregoing objective, features and advantages of the present disclosure clearer and more comprehensible, the present disclosure is further described in detail below with reference to the attached figures and specific embodiments.

Figures 1, 2:
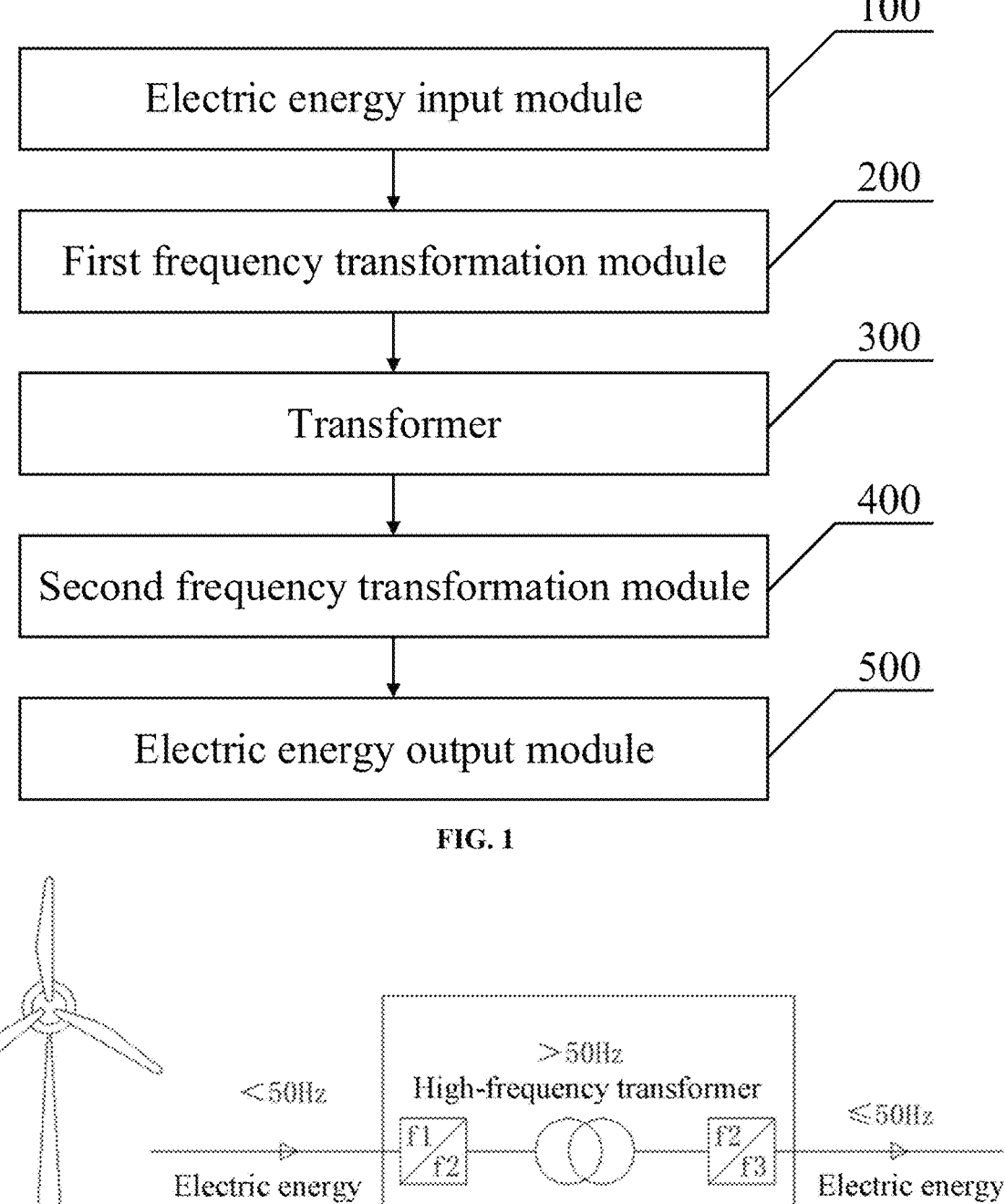
FIG. 1 is a structural schematic diagram of a voltage and frequency transformation system according to the embodiment of the present disclosure.
FIG. 2 is a detailed structure diagram of a voltage and frequency transformation system according to the embodiment of the present disclosure.

FIG. 1 illustrates an exemplary structure of the above-mentioned voltage and frequency transformation system. Each module is described in detail as follows.

An electric energy input module 100 is configured to input low-frequency electric energy with a frequency lower than a first predetermined frequency threshold. The low-frequency electric energy includes low-frequency and low-voltage electric energy or low-frequency and high-voltage electric energy. Where, the low-frequency and high-voltage electric energy is electric energy from a micro-gird and has a voltage falling within the range of 6 kV-35 kV; and the low-frequency and low-voltage electric energy is electric energy from a wind power generation system and has a voltage equivalent to the rated voltage of the wind power generation system, for example 690V.

In one example, the electric energy input module 100 may specifically be an electric transmission line of a wind farm. For example, the first predetermined frequency threshold may be 20 Hz, 25 Hz, 30 Hz and the like, which will not be described in details here.

A first frequency transformation module 200 is connected with the electric energy input module 100, and is configured to carry out frequency transformation on the low-frequency electric energy to obtain high-frequency electric energy with frequency higher than a second predetermined frequency threshold. The high-frequency electric energy includes first high-frequency and low-voltage electric energy or first high-frequency and high-voltage electric energy.

In one example, referring to FIG. 2, the first frequency transformation module 200 may specifically be a variable-frequency drive that converts 20 Hz low-frequency electric energy into 100 Hz high-frequency electric energy. As an example, the second predetermined frequency threshold may be 80 Hz, 85 Hz, 90 Hz and the like, which will not be described in details here.

A transformer 300 is connected with the first frequency transformation module 200, and is configured to carry out voltage transformation on the high-frequency electric energy to obtain second high-frequency electric energy after voltage transformation. The second high-frequency electric energy includes second high-frequency and high-voltage electric energy or second high-frequency and low-voltage electric energy. Where, the second high-frequency and low-voltage electric energy has a voltage equivalent to the rated voltage of electric terminals, such as 400V, and the second high-frequency and high-voltage electric energy has a voltage equivalent to a rated voltage of one of a power grid and the micro-grid. Generally, the rate voltage of the power grid falls within a range of 35 kV-220 kV, such as 110 kV or 220 kV.

7

Figure 3:
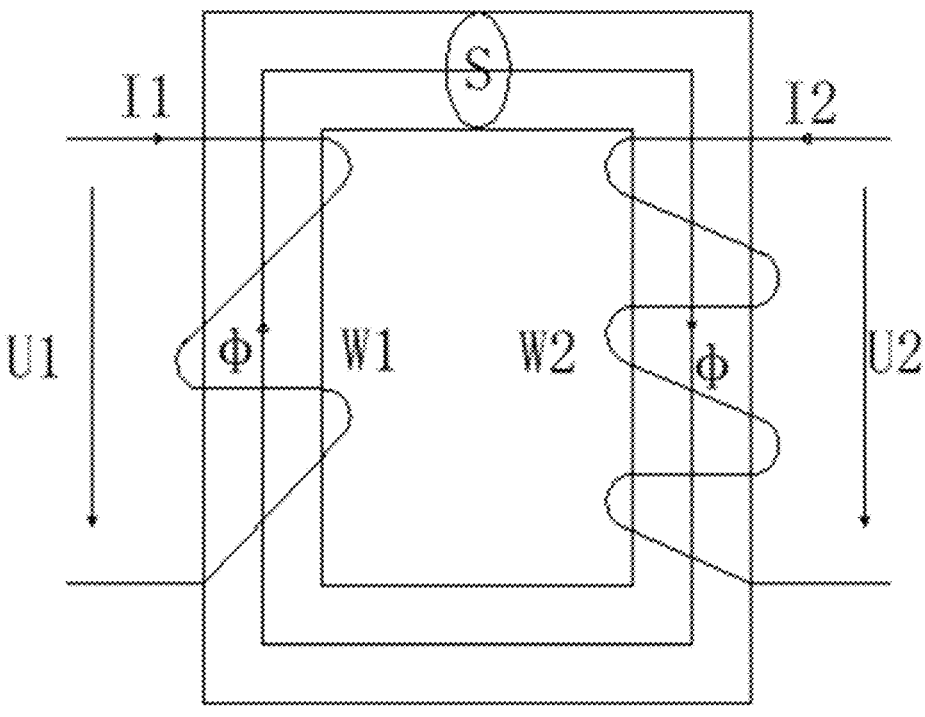
FIG. 3 is a schematic diagram of a principle of a transformer according to the embodiment of the present disclosure.
Figure 4:
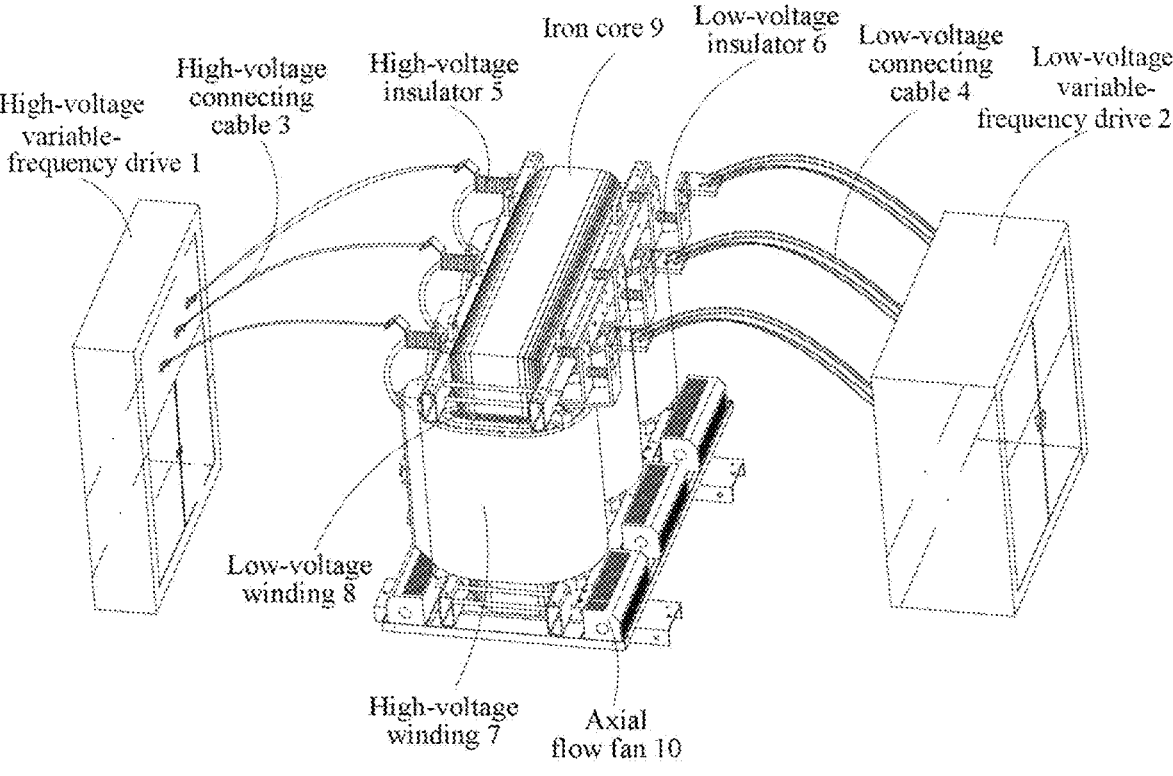
FIG. 4 is a schematic diagram of a specific structure of a transformer according to the embodiment of the present disclosure.

In one example, referring to FIG. 3 and FIG. 4, the embodiment of the present disclosure provides a low-frequency transformer, including a high-voltage variable-frequency drive 1, a low-voltage variable-frequency drive 2, a high-voltage connecting cable 3, a low-voltage connecting cable 4, a high-voltage insulator 5, a low-voltage insulator 6, a transformer high-voltage winding 7, a transformer low-voltage winding 8, a transformer iron core 9 and an axial flow fan 10.

A second frequency transformation module 400 is connected with the transformer 300, and is configured to carry out frequency transformation on the high-frequency electric energy after voltage transformation to obtain second low-frequency electric energy with frequency within a predetermined frequency threshold range. The second low-frequency electric energy includes second low-frequency and high-voltage electric energy or second low-frequency and low-voltage electric energy. The second low-frequency and high-voltage electric energy is used for long-distance power transmission. The second low-frequency and low-voltage electric energy is used for driving electric terminals for production and living.

In one example, referring to FIG. 2, the second frequency transformation module 400 may specifically be a variable-frequency drive that converts 100 Hz high-frequency electric energy into 50 Hz industrial-frequency electric energy. As an example, the predetermined frequency threshold range may be 49.8 Hz to 50.2 Hz, which will not be described in details here.

The frequency values of the high-frequency electric energy and the second high-frequency electric energy and the cross-sectional area of the transformer iron core have a linear relation.

The linear relation specifically includes:

when the voltage value of the high-frequency electric energy before or after voltage transformation is unchanged, the frequency value of the high-frequency electric energy is inversely correlated with the cross-sectional area of the transformer iron core;

the higher the frequency value of the high-frequency electric energy, the smaller the cross-sectional area of the transformer iron core; and the lower the frequency value of the high-frequency electric energy, the larger the cross-sectional area of the transformer iron core.

That is to say, higher frequency applications can utilize a transformer with an iron core having a smaller cross-sectional area, whereas lower frequency applications can utilize a transformer with an iron core having a larger cross sectional area.

When the voltage value of the high-frequency electric energy before or after voltage transformation is unchanged, the frequency value of the high-frequency electric energy is inversely correlated with the cross-sectional area of the transformer iron core, which is calculated by the following calculation equations:

$$U = 4.44 fN\phi; \phi = BS; U \infty fS.$$

Where U is the high-frequency voltage value; f is the frequency value of the high-frequency electric energy; N is the number of coil turns; φ is the magnetic flux intensity; B is the magnetic induction intensity; and S is the cross-sectional area of the transformer iron core.

8

In one example, when the frequency f is 20 Hz and the voltage value is 10 kV, the cross-sectional area of the iron core is that 50/20=2.5, namely the cross-sectional area of the iron core is 2.5 times of the cross-sectional area of the iron core of a normal industrial-frequency transformer.

In another example, when the frequency f is 100 Hz and the voltage value is 10 kV, the cross-sectional area of the iron core is that 50/100=0.5, namely the cross-sectional area of the iron core is 0.5 times of the cross-sectional area of the core of a normal industrial-frequency transformer.

It can be seen that with the doubled frequency, the cross-sectional area of the iron core is decreased by ½.

An electric energy output module 500 is connected with the second frequency transformation module 400, and is configured to output the second low-frequency electric energy.

The low-frequency and low-voltage electric energy, the first high-frequency and low-voltage electric energy and the second high-frequency and high-voltage electric energy correspond to the second low-frequency and high-voltage electric energy.

The low-frequency and high-voltage electric energy, the first high-frequency and high-voltage electric energy and the second high-frequency and low-voltage electric energy correspond to the second low-frequency and low-voltage electric energy.

In one example, the electric energy output module 500 specifically may be an electric transmission line of the power grid.

In conclusion, in the embodiment of the present disclosure, the low-frequency electric energy with frequency lower than the first predetermined frequency threshold value is input by the electric energy input module. The first frequency transformation module is connected with the electric energy input module, and is configured to carry out frequency transformation on the low-frequency electric energy to obtain the high-frequency electric energy with frequency higher than the second predetermined frequency threshold. The transformer is connected with the first frequency transformation module, and is configured to carry out voltage transformation on the high-frequency electric energy to obtain the high-frequency electric energy after voltage transformation. The second frequency transformation module is connected with the transformer, and is configured to carry out frequency transformation on the high-frequency electric energy after voltage transformation to obtain the low-frequency electric energy with frequency within the predetermined frequency threshold range. The electric energy output module is connected with the second frequency transformation module, and is configured to output the low-frequency electric energy. The transmission frequency of the low-frequency electric energy in the voltage transformation process is improved, thereby realizing the high-frequency transmission of the electric energy in the voltage transformation process, and reducing the cross-sectional area of the transformer iron core in the transmission process, and thus reducing the production cost of the voltage transformation system.

In order to achieve the above purpose, the embodiment of the present disclosure also provides the following scheme.

A voltage and frequency transformation method, referring to FIG. 5, includes the following operations:

block S1, inputting low-frequency electric energy with frequency lower than a first predetermined frequency threshold; the low-frequency electric energy including low-frequency and low-voltage electric energy or low-frequency and high-voltage electric energy;

block S2, carrying out frequency transformation on the low-frequency electric energy to obtain high-frequency electric energy with frequency higher than a second predetermined frequency threshold; the high-frequency electric energy including first high-frequency and low-voltage electric energy or first high-frequency and high-voltage electric energy;

block S3, carrying out voltage transformation on the high-frequency electric energy to obtain second high-frequency electric energy after voltage transformation; the second high-frequency electric energy including second high-frequency and high-voltage electric energy or second high-frequency and low-voltage electric energy;

block S4, carrying out frequency transformation on the high-frequency electric energy after voltage transformation to obtain second low-frequency electric energy with frequency within a predetermined frequency threshold range; the second low-frequency electric energy including second low-frequency and high-voltage electric energy or second low-frequency and low-voltage electric energy; the second low-frequency and high-voltage electric energy being used for long-distance power transmission; the second low-frequency and low-voltage electric energy being used for driving electric terminals for production and living;

block S5, outputting the second low-frequency electric energy;

where the low-frequency and low-voltage electric energy, the first high-frequency and low-voltage electric energy and the second high-frequency and high-voltage electric energy correspond to the second low-frequency and high-voltage electric energy; and the low-frequency and high-voltage electric energy, the first high-frequency and high-voltage electric energy and the second high-frequency and low-voltage electric energy correspond to the second low-frequency and low-voltage electric energy.

Further, the present disclosure also provides electronic device. The electronic device may include a processor, a communication interface, a memory and a communication bus. Wherein, the processor, the communication interface and the memory communicate with each other through the communication bus. The processor can call and execute the computer program in the memory so as to realize the voltage and frequency transformation method for wind power electric energy.

In addition, the computer program in the above-mentioned memory can be stored in a non-transitory computer-readable storage medium when being realized in the form of a software functional unit and sold or used as an independent product. Based on such an understanding, the technical solutions of the present disclosure essentially, or the part contributing to the prior art, or some of the technical solutions may be implemented in a form of a software product. The computer software product is stored in a non-transitory storage medium, and includes several instructions for instructing a computer device (which may be a personal computer, a server, a network device, or the like) to perform all or some of the operations of the methods in the embodiments of the present disclosure. The above-mentioned non-transitory storage medium includes various media that can store program codes, such as a USB flash drive, a mobile hard drive, a read-only memory, a random access memory, a magnetic disc, or an optical disc.

Further, the present disclosure also provides a non-transitory computer readable memory medium stores a computer program. When the computer program is executed, the voltage and frequency transformation method for wind power electric energy is realized.

All embodiments in this specification are described in a progressive manner. Each embodiment focuses on differences from other embodiments. For the part that is the same or similar between different embodiments, reference may be made between the embodiments. The system disclosed in the embodiment corresponds to the method disclosed in the embodiment, and therefore the description is relatively brief. Related information refers to descriptions of the related parts in the method.

Several examples are used for illustration of the principles and implementation methods in the embodiment of the present disclosure. The description of the embodiments is used to help illustrate the method and the core principles in the embodiment of the present disclosure; and meanwhile, those skilled in the art can make various modifications in terms of specific embodiments and scope of application in accordance with the teachings in the embodiment of the present disclosure. In summary, the contents of this specification should not be understood as the limitation in the embodiment of the present disclosure.

What is claimed is:

1. A voltage and frequency transformation system, comprising:

an electric energy input circuitry, to input low-frequency electric energy with frequency lower than a first predetermined frequency threshold; the low-frequency electric energy being one of low-frequency and low-voltage electric energy and low-frequency and high-voltage electric energy;

a first frequency transformation circuitry, connected with the electric energy input circuitry, to carry out frequency transformation on the low-frequency electric energy to obtain high-frequency electric energy with frequency higher than a second predetermined frequency threshold; the high-frequency electric energy being one of first high-frequency and low-voltage electric energy and first high-frequency and high-voltage electric energy;

a transformer, connected with the first frequency transformation circuitry, to carry out voltage transformation on the high-frequency electric energy to obtain second high-frequency electric energy after voltage transformation; the second high-frequency electric energy being one of second high-frequency and high-voltage electric energy and second high-frequency and low-voltage electric energy;

a second frequency transformation circuitry, connected with the transformer, to carry out frequency transformation on the high-frequency electric energy after voltage transformation to obtain second low-frequency electric energy with frequency within a predetermined frequency threshold range; the second low-frequency electric energy being one of second low-frequency and high-voltage electric energy and second low-frequency and low-voltage electric energy; the second low-frequency and high-voltage electric energy to be used for long-distance power transmission; the second low-frequency and low-voltage electric energy to be used for driving electric terminals;

an electric energy output terminal, connected with the second frequency transformation circuitry, to output the second low-frequency electric energy;

wherein in a case that the low-frequency electric energy is the low-frequency and low-voltage electric energy, the high-frequency electric energy is the first high-frequency and low-voltage electric energy, the second high-frequency electric energy is the second high-frequency and high-voltage electric energy, and the second low-frequency electric energy is the second low-frequency and high-voltage electric energy; and in a case that the low-frequency electric energy is the low-frequency and high-voltage electric energy, the high-frequency electric energy is the first high-frequency and high-voltage electric energy, the second high-frequency electric energy is the second high-frequency and low-voltage electric energy, and the second low-frequency electric energy is the second low-frequency and low-voltage electric energy;

wherein the low-frequency and low-voltage electric energy is electric energy from a wind power generation system and has a voltage equivalent to the rated voltage of a wind power generation system, and the low-frequency and high-voltage electric energy is electric energy from a micro-grid and has a voltage equivalent to a rated voltage of the micro-grid; and the second high-frequency and low-voltage electric energy has a voltage equivalent to a rated voltage of the electric terminals, and the second high-frequency and high-voltage electric energy has a voltage equivalent to a rated voltage of a power grid or equivalent to a rated voltage of the micro-grid.

2. The voltage and frequency transformation system according to claim 1, wherein a frequency value of the high-frequency electric energy and the second high-frequency electric energy have a linear relation with the cross-sectional area of a transformer core.

3. The voltage and frequency transformation system according to claim 2, wherein the linear relation comprises:

when a voltage value of the high-frequency electric energy before or after voltage transformation is unchanged, the frequency value of the high-frequency electric energy is inversely correlated with the cross-sectional area of the transformer iron core.

4. The voltage and frequency transformation system according to claim 3, wherein when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44 fN\varphi;$$

$$\phi = BS;$$

$$U \infty fS;$$

wherein U is a high-frequency voltage value; f is the frequency value of the high-frequency electric energy; N is a number of coil turns; $\varphi$ is magnetic flux intensity; B is magnetic induction intensity; and S is the cross-sectional area of the transformer iron core.

5. A voltage and frequency transformation method, comprising:

inputting low-frequency electric energy with frequency lower than a first predetermined frequency threshold; the low-frequency electric energy being one of low-frequency and low-voltage electric energy and low-frequency and high-voltage electric energy;

carrying out frequency transformation on the low-frequency electric energy to obtain high-frequency electric energy with frequency higher than a second predetermined frequency threshold; the high-frequency electric energy being one of first high-frequency and low-voltage electric energy and first high-frequency and high-voltage electric energy;

carrying out voltage transformation on the high-frequency electric energy to obtain second high-frequency electric energy after voltage transformation; the second high-frequency electric energy being one of second high-frequency and high-voltage electric energy and second high-frequency and low-voltage electric energy;

carrying out frequency transformation on the high-frequency electric energy after voltage transformation to obtain second low-frequency electric energy with frequency within a predetermined frequency threshold range; the second low-frequency electric energy being one of second low-frequency and high-voltage electric energy and second low-frequency and low-voltage electric energy; the second low-frequency and high-voltage electric energy being used for long-distance power transmission; the second low-frequency and low-voltage electric energy being used for driving electric terminals;

outputting the second low-frequency electric energy;

wherein in a case that the low-frequency electric energy is the low-frequency and low-voltage electric energy, the high-frequency electric energy is the first high-frequency and low-voltage electric energy, the second high-frequency electric energy is the second high-frequency and high-voltage electric energy, and the second low-frequency electric energy is the second low-frequency and high-voltage electric energy; and in a case that the low-frequency electric energy is the low-frequency and high-voltage electric energy, the high-frequency electric energy is the first high-frequency and high-voltage electric energy, the second high-frequency electric energy is the second high-frequency and low-voltage electric energy, and the second low-frequency electric energy is the second low-frequency and low-voltage electric energy;

wherein the low-frequency and low-voltage electric energy is electric energy from a wind power generation system and has a voltage equivalent to the rated voltage of a wind power generation system, and the low-frequency and high-voltage electric energy is electric energy from a micro-grid and has a voltage equivalent to a rated voltage of the micro-grid; and the second high-frequency and low-voltage electric energy has a voltage equivalent to a rated voltage of the electric terminals, and the second high-frequency and high-voltage electric energy has a voltage equivalent to a rated voltage of a power grid or equivalent to a rated voltage of the micro-grid.

6. The voltage and frequency transformation method according to claim 5, wherein a frequency value of the high-frequency electric energy and the second high-frequency electric energy have a linear relation with the cross-sectional area of a transformer iron core.

7. The voltage and frequency transformation method according to claim 6, wherein the linear relation comprises:

when a voltage value of the high-frequency electric energy before or after voltage transformation is unchanged, the frequency value of the high-frequency electric energy is inversely correlated with the cross-sectional area of the transformer iron core.

8. The voltage and frequency transformation method according to claim 7, wherein when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44\,fN\varphi;$$

$$\phi = BS;$$

$$U \infty fS;$$

wherein U is a high-frequency voltage value; f is the frequency value of the high-frequency electric energy; N is a number of coil turns; $\varphi$ is magnetic flux intensity; B is magnetic induction intensity; and S is the cross-sectional area of the transformer iron core.

9. An electronic device, comprising: a memory, at least one processor circuit, and a computer program stored in the memory, wherein when the processor executes the computer program, the voltage and frequency transformation method according to claim 5 is implemented.

10. The electronic device according to claim 9, wherein a frequency value of the high-frequency electric energy and the second high-frequency electric energy have a linear relation with the cross-sectional area of a transformer iron core.

11. The electronic device according to claim 10, wherein the linear relation comprises:

when a voltage value of the high-frequency electric energy before or after voltage transformation is unchanged, the frequency value of the high-frequency electric energy is inversely correlated with the cross-sectional area of the transformer iron core.

12. The electronic device according to claim 11, wherein when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44\,fN\varphi;$$

$$\phi = BS;$$

$$U \infty fS;$$

wherein U is a high-frequency voltage value; f is the frequency value of the high-frequency electric energy; N is a number of coil turns; $\varphi$ is magnetic flux intensity; B is magnetic induction intensity; and S is the cross-sectional area of the transformer iron core.

13. A non-transitory computer readable medium comprising a computer program stored therein, wherein when the computer program is executed by at least one processor circuit, the voltage and frequency transformation method according to claim 5 is implemented.

14. The non-transitory computer readable medium according to claim 13, wherein a frequency value of the high-frequency electric energy and the second high-frequency electric energy have a linear relation with the cross-sectional area of a transformer iron core.

15. The non-transitory computer readable medium according to claim 14, wherein the linear relation comprises:

when a voltage value of the high-frequency electric energy before or after voltage transformation is unchanged, the frequency value of the high-frequency electric energy is inversely correlated with the cross-sectional area of the transformer iron core.

16. The non-transitory computer readable medium according to claim 15, wherein when the voltage value of the high-frequency electric energy before or after voltage transformation is unchanged, the frequency value of the high-frequency electric energy is inversely correlated with the cross-sectional area of the transformer iron core, which is expressed as follows:

$$U = 4.44\,fN\varphi;$$

$$\phi = BS;$$

$$U \infty fS;$$

wherein U is a high-frequency voltage value; f is the frequency value of the high-frequency electric energy; N is a number of coil turns; $\varphi$ is magnetic flux intensity; B is magnetic induction intensity; and S is the cross-sectional area of the transformer iron core.

\*  \*  \*  \*  \*